(12) United States Patent
Ai et al.

(10) Patent No.: US 8,747,277 B2
(45) Date of Patent: Jun. 10, 2014

(54) GEAR TRANSMISSION LOAD SHARING MECHANISM

(75) Inventors: Xiaolan Ai, Massillon, OH (US); Curt Orkin, West Hartford, CT (US); Randy P. Kruse, North Canton, OH (US); Ryan Forbes, Massillon, OH (US); Matthew Wilmer, North Canton, OH (US); Neil Chiavaroli, Hamden, CT (US)

(73) Assignee: The Timken Company, North Canton, OH (US)

( * ) Notice: Subject to any disclaimer, the term of this patent is extended or adjusted under 35 U.S.C. 154(b) by 59 days.

(21) Appl. No.: 13/634,427

(22) PCT Filed: Mar. 11, 2011

(86) PCT No.: PCT/US2011/028093
§ 371 (c)(1),
(2), (4) Date: Sep. 12, 2012

(87) PCT Pub. No.: WO2011/112930
PCT Pub. Date: Sep. 15, 2011

(65) Prior Publication Data
US 2013/0005528 A1    Jan. 3, 2013

Related U.S. Application Data

(60) Provisional application No. 61/313,294, filed on Mar. 12, 2010.

(51) Int. Cl.
*F16H 57/08* (2006.01)
(52) U.S. Cl.
USPC .......................................................... 475/339

(58) Field of Classification Search
USPC ............................................ 475/338–340, 348
See application file for complete search history.

(56) References Cited

U.S. PATENT DOCUMENTS

| | | | |
|---|---|---|---|
| 6,743,148 B2 * | 6/2004 | Hayabuchi et al. | 475/331 |
| 6,931,959 B2 * | 8/2005 | Giuriati | 74/413 |
| 6,966,865 B2 * | 11/2005 | Drago et al. | 475/338 |
| 7,507,180 B2 | 3/2009 | Robuck | |
| RE41,313 E * | 5/2010 | Simon | 475/340 |
| 2006/0293143 A1* | 12/2006 | Cho | 475/339 |
| 2009/0163315 A1* | 6/2009 | Rihn | 475/340 |

OTHER PUBLICATIONS

International Search Report for PCT application PCT/US2011/028093 mailed May 17, 2011.
Written Opinion of the International Search Authority for PCT application PCT/US2011/028093.

* cited by examiner

*Primary Examiner* — Erin D Bishop
*Assistant Examiner* — Huan Le
(74) *Attorney, Agent, or Firm* — Michael Best & Friedrich LLP (57) ABSTRACT

A method for use with a transmission system (A, A1, B) incorporating a split gear assembly (20, 120, 220) for splitting an applied input load between two or more reaction gears (30, 40, 130, 140, 230, 240) or pathways to selectively positioning a support bearing (50, 150, 250) to achieve an optimized load distribution (LRT) among a set of drive planet pinions (22, 122, 222) and idler planet pinions (70, 170, 270) in the transmission system.

23 Claims, 6 Drawing Sheets

GEAR TRANSMISSION LOAD SHARING MECHANISM

CROSS-REFERENCE TO RELATED APPLICATIONS

The present application is related to, and claims priority from, U.S. Provisional Application Ser. No. 61/313,294 filed on Mar. 12, 2010 and International Application PCT/US2011/028093 filed Mar. 11, 2011 and published under International Publication No. WO 2011/112930, by Ai et al. for "Gear Transmission Load Sharing Mechanism", both of which are herein incorporated by reference.

STATEMENT REGARDING FEDERALLY SPONSORED RESEARCH

Not Applicable.

BACKGROUND OF THE INVENTION

The present invention relates, in general, to a load sharing mechanism for power transmissions and in particular to a load sharing mechanism for a compound planetary gear transmission with a set of stepped planet gears.

Rotary wing aircraft typically use a high-speed turbine engine to drive the rotor or propeller. A main gear transmission between the engine and the rotor is necessary to transmit engine power while reducing the engine speed to achieve the appropriate rotor speed. The main gear transmission is usually the heaviest subsystem in the drive train of the aircraft. Increasing power throughput and reducing the weight of the transmission is very desirable for modern rotary wing aircraft.

One effective way to improve power density in a main gear transmission is to divide the input torque supplied from the engine or other power source across multiple paths through the transmission to the output shaft. Each discrete path requires a smaller individual gear member, which leads to an overall transmission design that is lighter in weight, is compact in size, and has smaller gear face widths due to the reduced loads applied at each gear mesh. The smaller, but numerous, gears also require smaller supporting bearings, which correspondingly have an increased operational life span due to the reduced application of torque. An exemplary power dense planetary gear transmission consists of a compound planetary gear-train having a set of stepped planet gears. Each stepped planet gear includes a large planet gear driven by a sun gear coupled to the input shaft and a small drive planet pinion. The stepped planet gears may have a flexible shaft between the large planet gear and the small drive planet pinion. The small drive planet pinions are each disposed between, and engaged with, the outer circumference of a first reaction or idler sun gear and the inner circumference of a second reaction or ring gear, and are secured to the respective large gears by a shaft fitted through a cluster gear support bearing. A planet carrier supports a set of small and simple idler planet pinions to share the torque, distributing load carried by the main gear transmission among the drive planet pinions and the idler planet pinions disposed between the ring gear and the idler sun gear. The idler planet pinions have non-floating shafts with respect to the planet carrier.

A second exemplary transmission is a split-torque face gear transmission, where a stepped gear is used to drive a primary face gear and an idler face gear; the stepped gear being sandwiched between the primary face gear and the idler face gear. The stepped gears have a floating or pivoting shaft, with small idler gears mounted to fixed shafts being used as crossover gears to provide multiple power paths to share the load from the input shaft to the output shaft.

When splitting the driving torque loads applied through a transmission from an input shaft to an output shaft between two reaction gears or pathways, either through a compound planetary gear-train transmission or a split-torque face gear transmission, it is preferable to provide for an optimized load distribution among the various drive plant pinions and idler planet pinions between the reaction gears and primary gear in order to achieve a maximum load carrying capacity for the transmission. Accordingly, it would be advantageous to provide a method by which supporting components within the transmission can be selectively positioned in order to achieve an optimized load distribution.

BRIEF SUMMARY OF THE INVENTION

Briefly stated, the present disclosure provides a method for use with a transmission system incorporating a gear assembly for splitting an applied load between multiple pathways to selectively position a support bearing to achieve an optimized load distribution among drive planet pinions and idler planet pinions.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1:
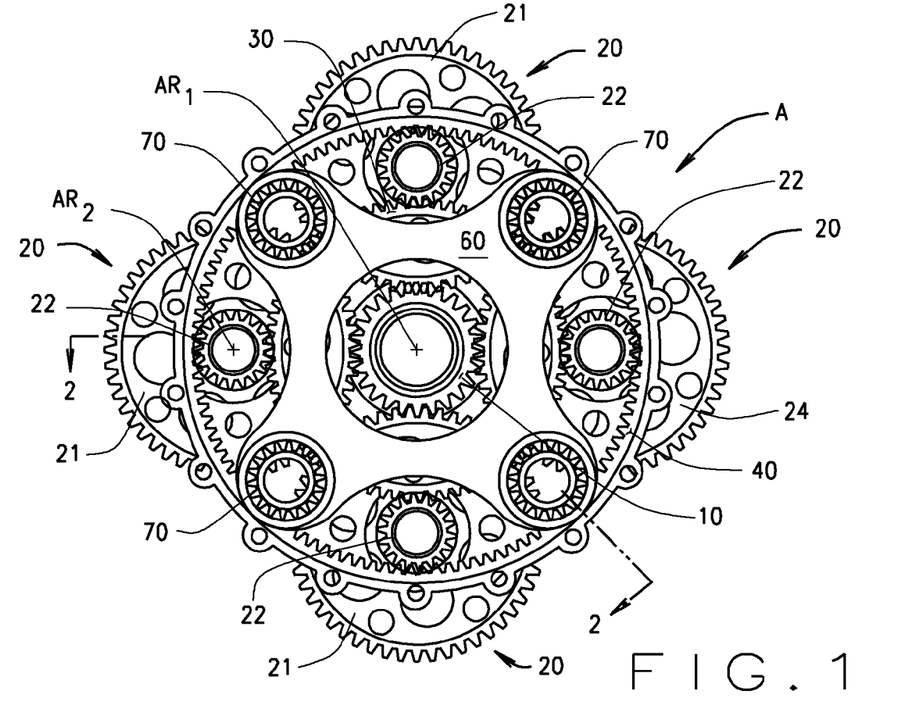
FIG. 1 is a top plan view of a prior art high ratio epicyclic gear transmission with improved load carrying capacity.
Figure 2:
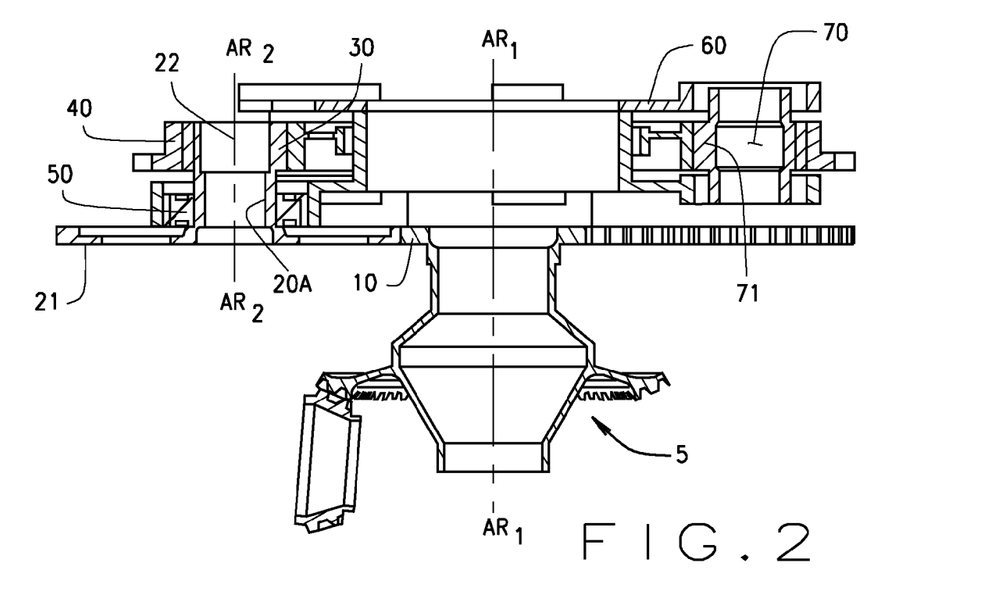
FIG. 2 is a sectional view of the gear transmission of FIG. 1, taken along segment 2-2.
Figure 3:
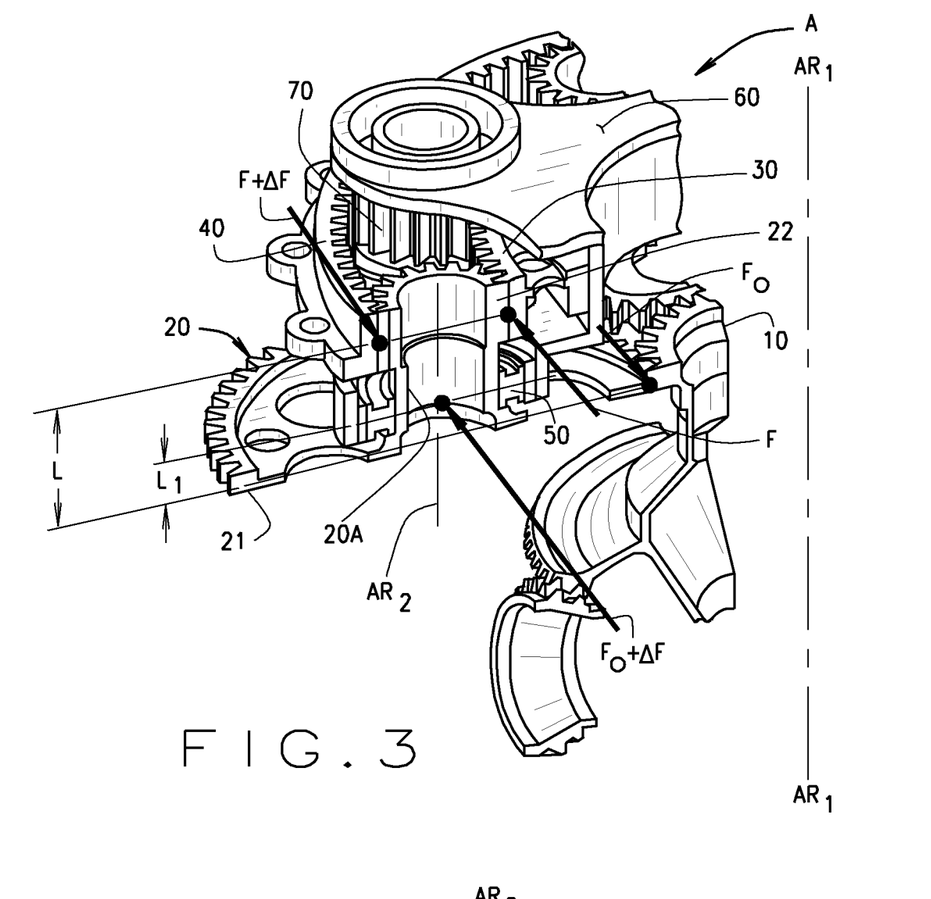
FIG. 3 is a quarter sectional view of an embodiment of the gear transmission of the present disclosure, taken at the vertical plane (S) between the axis of rotation $AR_1$ and $AR_2$, illustrating gear meshing forces in a tangential direction.

Referring to the figures, and to FIGS. 1-3 in particular, a preferred embodiment of a main gear transmission of the current invention is shown generally at (A). The main gear transmission (A) includes an axial drive or sun gear (10) coupled to an input shaft assembly (5), an array of stepped cluster planet gear sets (20) each having a large planet gear (21) engaged with the sun gear (10), and a small load-splitting drive planet pinion gear (22) coupled to the large planet gear (21) by a shaft (20A) fitted through a cluster gear support bearing (50). The drive planet pinion gears (22) are each disposed between, and engaged with, an outer circumference of a first reaction or idler sun gear (30) and an inner circumference of a second reaction or ring gear (40), and are secured to the respective large gears (21) by a shaft (20A) fitted through the cluster gear support bearing (50). The drive sun gear (10) defines a first axis of ration ($AR_1$), while each stepped cluster planet gear set (20) defines a second axis of rotation ($AR_2$). The two axis of rotation define a vertical plane (S), within which the two gears (21, 22) in each stepped cluster planet gear set (20) are spaced apart by a vertical distance (L). The pitch diameter of the large planet gear (21) in each cluster planet gear set (20) is defined as $D_0$, while the pitch diameter of each small load splitting drive planet pinion gear (22) is defined as $D_1$.

During operation, the drive sun gear (10) meshes with the large planet gear (21) of each stepped cluster planet gear set (20), exerting a meshing force which has a tangential component ($F_o$) perpendicular to the plane (S), as shown in FIG. 3. The first reaction or idler sun gear (30) is meshed with the small load splitting planet pinion gears (22) at the same side towards axis ($AR_1$) as the drive sun gear (10). The mesh generates a meshing force which has a tangential component (F) perpendicular to plane (S). The second reaction or ring gear (40) meshes with small load-splitting planet pinion gears (22) opposite to the mesh with the first reaction gear (30). This mesh, again, generates a meshing force which has a tangential component (F+ΔF) perpendicular to the plane (S). All of the meshing forces combine together, requiring a reactive balancing force from the bearing (50) to maintain the stepped cluster planet gear (20) in the proper place.

To distribute the tangential meshing forces between the idler sun gear (30) and ring gear (40), the bearings (50) are configured to support each of the stepped cluster planet gears (20). The bearing (50) is positioned between the horizontal plane defined by the drive sun gear (10) and the horizontal plane defined by two reaction gears (30, 40) about the axis ($AR_2$), at a distance ($L_1$) measured from the horizontal plane defined by the drive sun gear (10). The desired ratio of the tangential meshing force generated between the first reaction gear (idler sun gear) (30) and the load-splitting planet pinion gears (22) to the tangential meshing force generated between the second reaction gear (ring gear) (40) and the load-splitting planet pinion gears (22) is assumed to be:

$$LR_T = \frac{F}{F + \Delta F} \qquad \text{(Eqn. 1)}$$

The location ($L_1$) along axis ($AR_2$) of the bearing (50) is set forth as:

$$\frac{L_1}{L - L_1} = \left(\frac{1 - LR_T}{1 + LR_T}\right)\frac{D_0}{D_1} \qquad \text{(Eqn. 2)}$$

Figure 4:
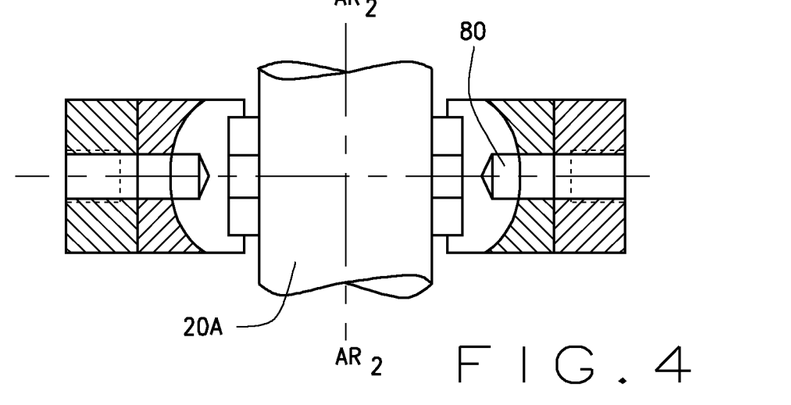
FIG. 4 is a sectional view of a cluster gear support bearing incorporating a pivot pin.

It will be understood by those skilled in the art, that the bearing (50) supporting each of the stepped cluster planet gears (20) may assume any of a variety of different forms, and that a self-aligning bearing, any bearing with low tilting stiffness, or any bearing with low tilting stiffness in and out of the (S) plane, can be used alternatively to achieve the same function. For example, the bearing (50) may be an internal self-aligning bearing, such as a spherical ball bearing, a spherical roller bearing, or even a toroidal roller bearing. Alternatively, the bearing (50) may be an external self-aligning bearing, such as bearings with an outer spherical seat or bearings with inner spherical seat. The bearing (50) can be integrated with the shaft (20A) between the large planet gear (21) and the small planet drive pinion (22). Alternatively, as shown in FIG. 4, a pivot pin (80) may be used to prevent undesirable tilting of the stepped cluster planet gear (20) while allowing for unidirectional pivoting of the stepped cluster planet gear (20) in the tangential plane.

Figure 5:
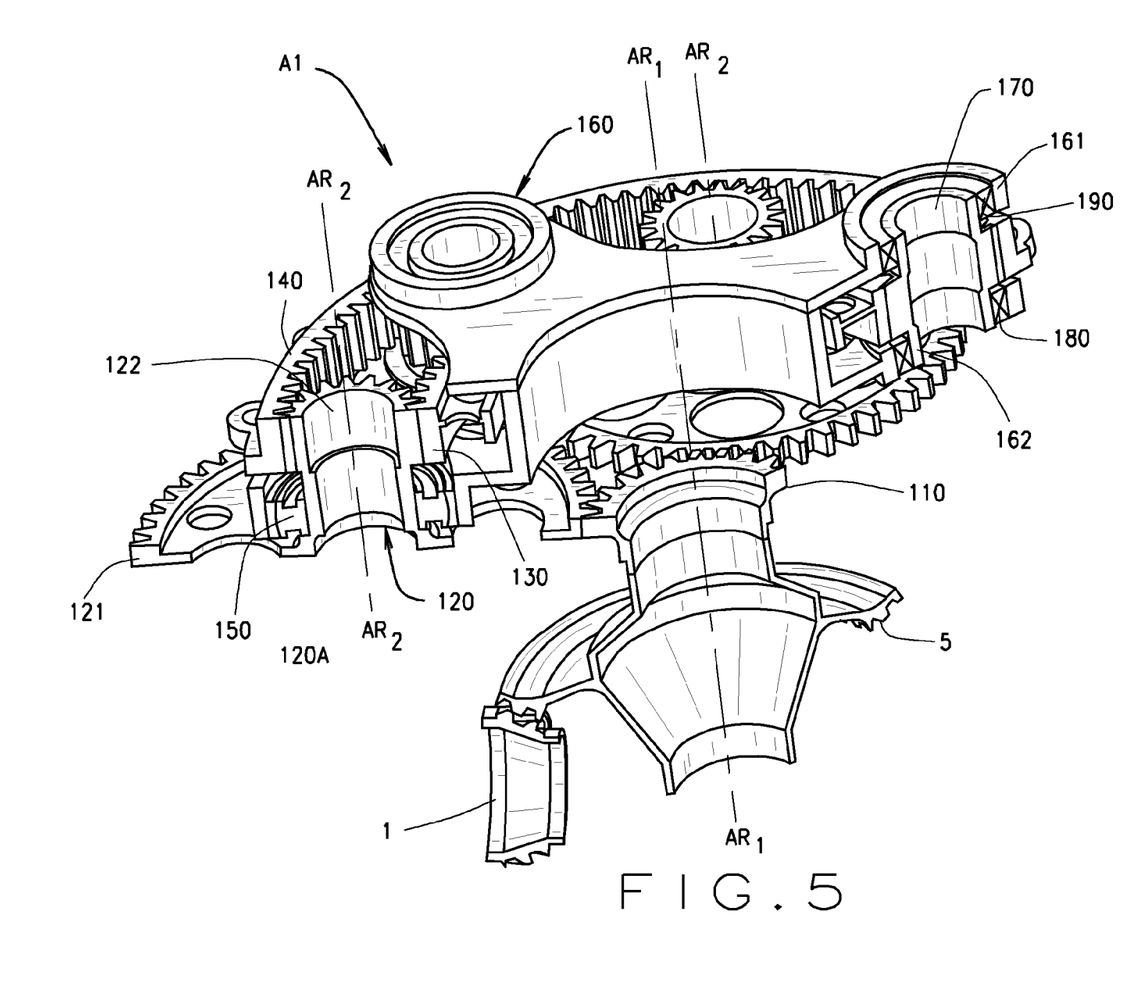
FIG. 5 is a sectional view of an embodiment of the gear transmission of the present disclosure.

FIG. 5 illustrates a sectional view of an example of a main gear transmission (A1) where the load sharing mechanism disclosed above is implemented with a self-aligning bearing (150). The main gear transmission (A1) is a compound planetary gear train wherein the first reaction gear takes the form of an idler sun gear (130); and the second reaction gear is a fixed ring gear (140). The load-splitting planet pinion gears are the drive planet gears (122). A set of idler planet gears (170) are used in addition to the load-splitting planet pinion gears (122) to improve load carrying capacity. Each drive planet gear (122) is coupled to a large planet gear (121) by a shaft (120A) to form a stepped cluster planet gear set (120). The compound planetary gear train (A1) further includes a planet carrier (160) to support the set of idler planet gears (170). Each of the stepped cluster planet gear sets (120) are supported on the planet carrier (160) by self-aligning bearings (150) which allow the drive planet gears (122) to float, with respect to the carrier (160), in the annular space between idler sun gear (130) and the fixed ring gear (140). In contrast, the idler planet gears (170) are straddle mounted on the planet carrier (160) through bearings (180) and (190), to restrict any substantial floating with respect to the planet carrier (160).

Figure 6:
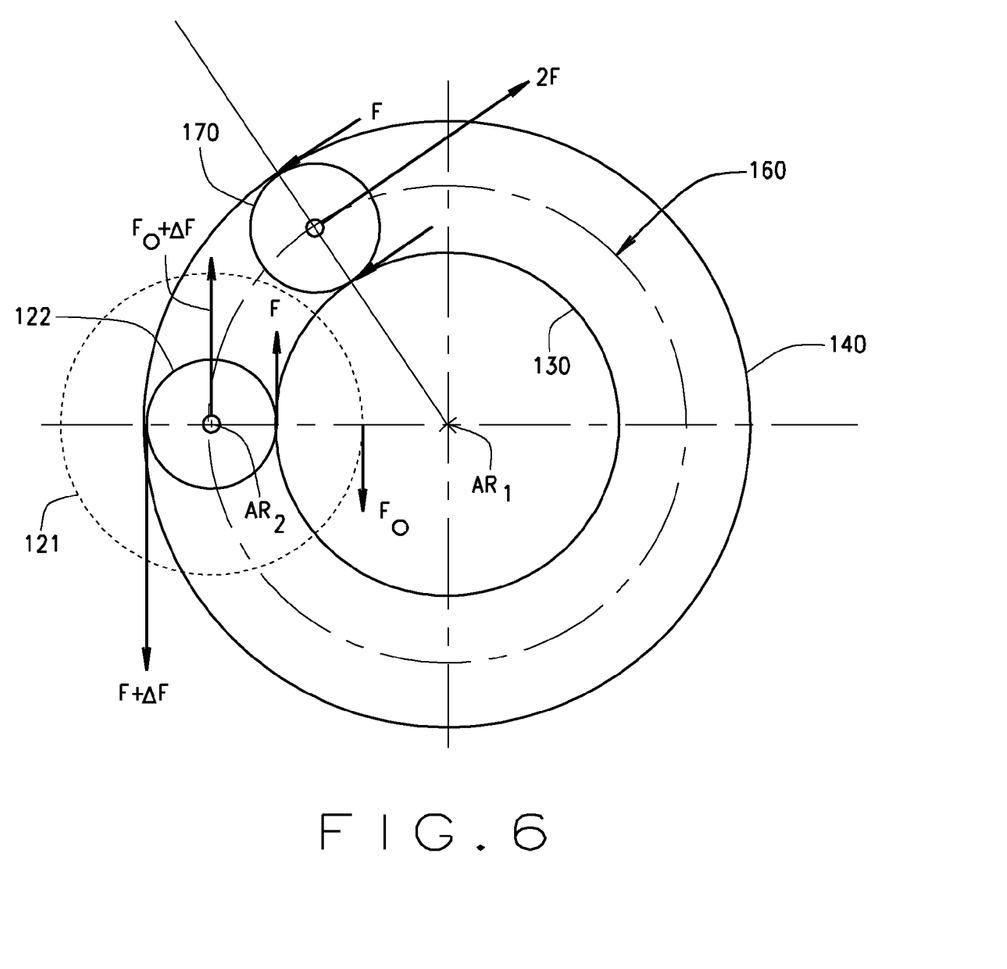
FIG. 6 is a diagrammatic representation of gear meshing forces in a tangential direction in an embodiment of the gear transmission of the present disclosure.

As seen in FIG. 6, during operation of the main gear transmission (A1), the tangential meshing force (F) is transmitted through the idler sun gear (130) to each of the idler planet gears (170). As can be appreciated, the gear teeth of each drive planet gear (122) are subjected to unidirectional bending, while as the gear teeth of each of the idler planet gears (170) are subjected to bidirectional bending, as shown by the direction of the forces. The maximum tangential force for each drive planet (122) is F+ΔF and the maximum tangential force for each idler planet gear (170) is F. To maintain an equal safety margin against gear tooth bending failure, it is highly desirable to have the idler planet gears (170) transmitting less tangential force than the drive planet gears (122). That is to say, $$LR_T = \frac{F}{F + \Delta F} \leq 1 \qquad \text{(Eqn. 3)}$$

In practical application, it is recommended to have a load sharing ratio ($LR_T$) between 0.5 and 1.0, that is:

$$0.5 \leq LR_T \leq 1 \quad \text{(Eqn. 4)}$$

This leads to the following relationship:

$$0 \leq \frac{L_1}{L - L_1} \leq \frac{1}{3}\left(\frac{D_0}{D_1}\right) \quad \text{(Eqn. 5)}$$

The endurance limiting stress for reverse-bending gear tooth is rough 70% of the endurance limiting stress for a unidirectional-bending gear tooth. Thus, the load ratio $LR_T$=0.7 is suggested. Consequently, the vertical position ($L_1$) of the self-aligning bearing (150) is determined, according to:

$$L_1 = \frac{L}{1 + 5.667\left(\frac{D_1}{D_0}\right)} \quad \text{(Eqn. 6)}$$

Meshing between the drive sun gear (110) and each large planet gear (121) results in a radial meshing force ($F_{ON}$). An additional radial force ($\Delta F_N$) is required at the mesh between the small drive planet gear (122) and the idler sun gear (130) to achieve radial equilibrium. This additional radial force ($\Delta F_N$) can be obtained by allowing both sides of the gear teeth of the small drive planet gear (122) to make contact, such that the gear mesh would effectively have zero backlash. A disadvantage to a zero-backlash mesh is that the back side of the gear teeth will experience extremely high sliding velocities and thus generate excessive of heat, resulting in wear. Accordingly, it is necessary to introduce another means to support the additional load.

Figure 7:
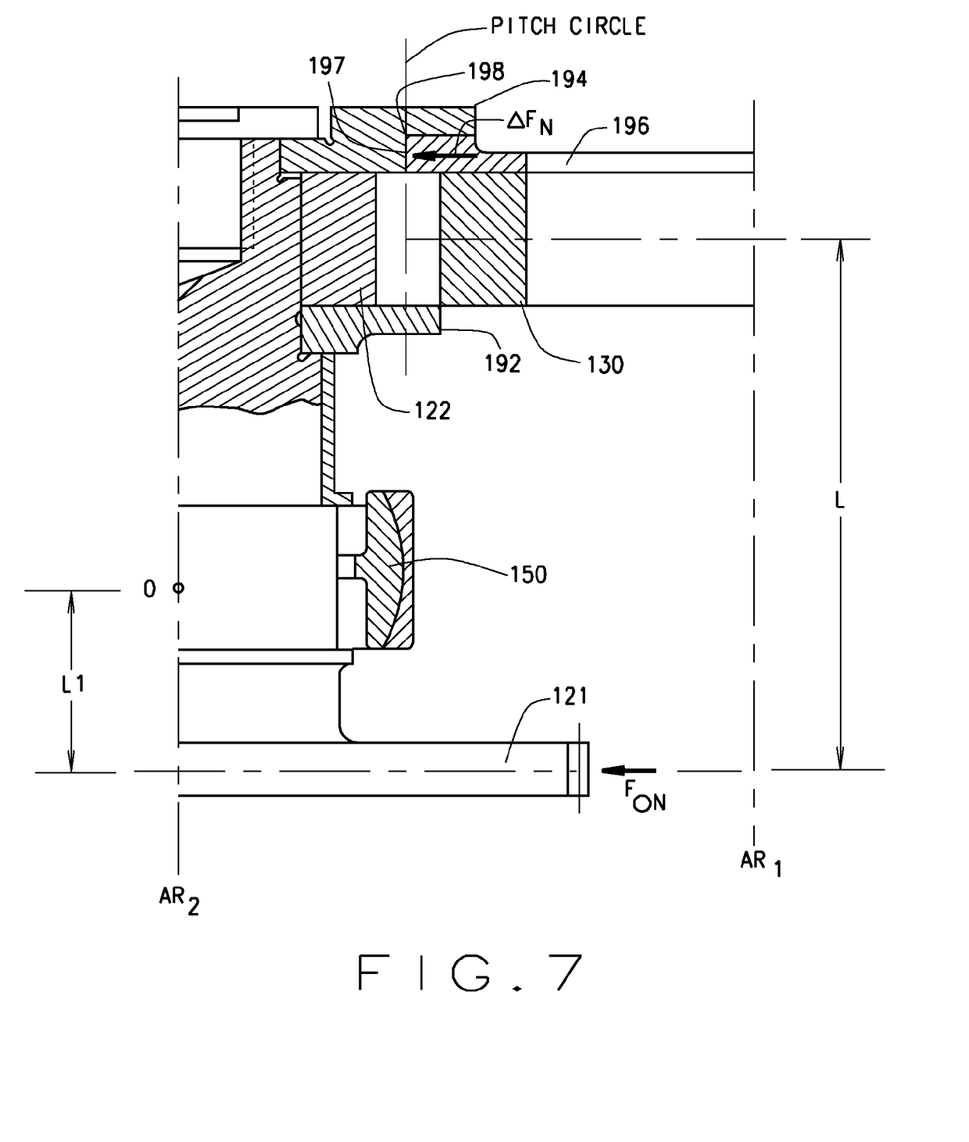
FIG. 7 is a sectional view of a cluster gear embodiment incorporating rolling surfaces at the pitch circle of the small drive planet and the idler sun gear.

As shown in the sectional view of FIG. 7, support for the additional load of the radial force ($\Delta F_N$) can be provided by a pair of rolling surfaces (197) and (198) at the pitch circles of the small drive planet gear (122) and the idler sun gear (130). The rolling surfaces (197, 198) have the same diameters as the gear pitch diameters, and function as pure rolling elements to eliminate sliding friction. Additionally shown in FIG. 7, axial retention washers (192) and (194) at both end faces of the small drive planet gear (122) maintain both the small drive planet (122) and the idler sun gear (130) in proper axial alignment. The cylindrical surface (197) of the upper retention washer (194) rolls against an adjacent cylindrical surface (198) of a retention ring (196), providing the additional radial force ($\Delta F_N$) to balance the separating force ($F_{ON}$) at the large planet gear (121). The idler sun gear (130) is allowed to float in a radial direction with respect to the retention ring (196). This helps to ensure an equal load sharing among the idler planet gears (170).

Figure 8:
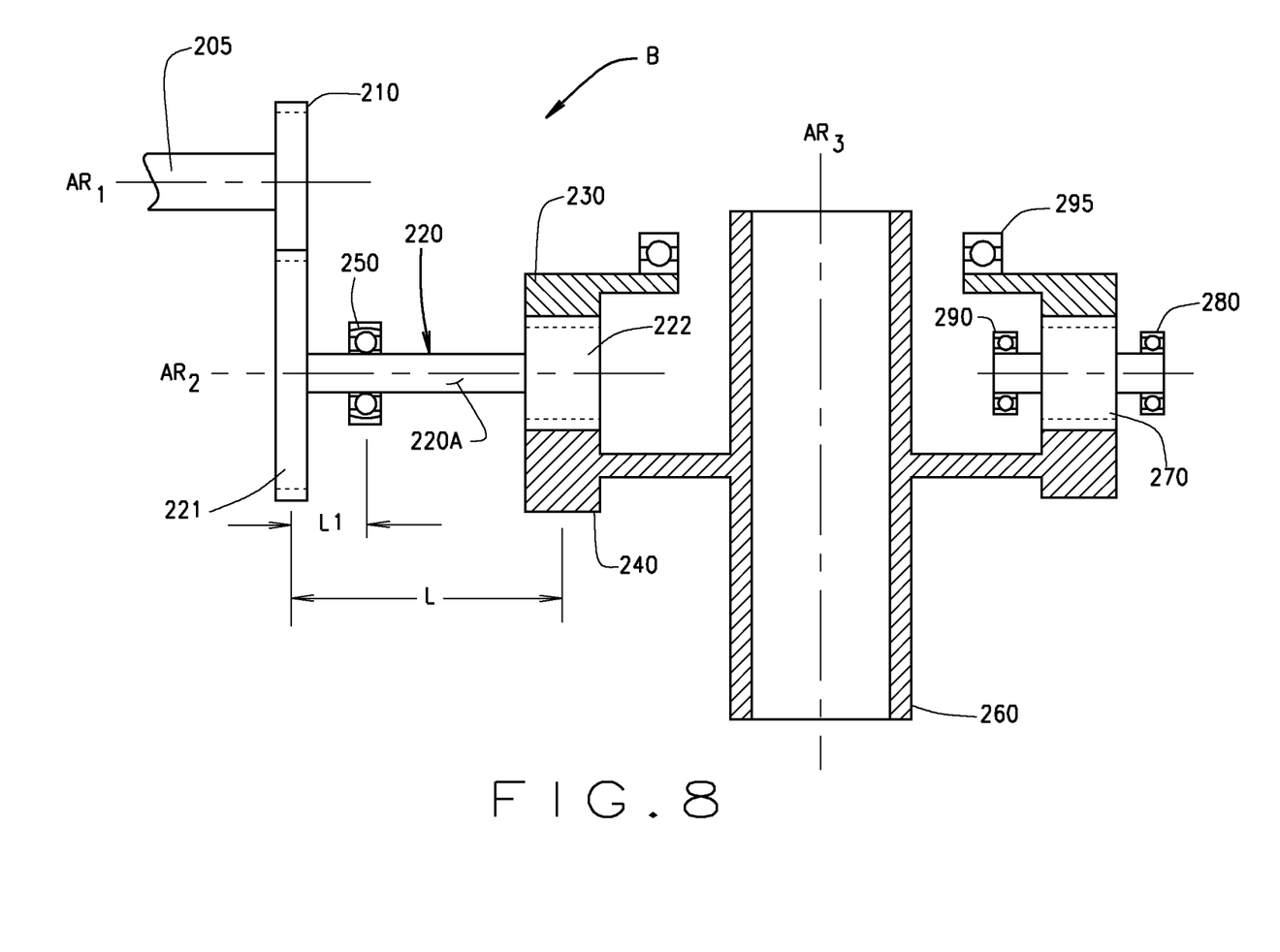
FIG. 8 is a sectional illustration of a split-torque face gear transmission embodiment of the gear transmission of the present disclosure for load sharing.

The methods of the present invention for determining placement of a self-aligning bearing (50, 150) to optimize load ratios between components in a split-torque transmission (A, A1) are not limited to epicyclic gear trains as seen in FIGS. 1-3 and 5, and may, for example, be utilized in a split-torque face gear transmission (B) as shown in FIG. 8. In a split-torque face gear transmission (B), the first reaction gear takes the form of an idler face gear (230) mounted for rotation on bearings (295) relative to the housing of the gear transmission (B); the second reaction gear is the primary face gear (240) that is connected circumferentially to an output shaft (260) for rotation about an axis ($AR_3$). Each stepped cluster gear is defined by a load-splitting gear cluster (220), including a large gear (221) and a small drive gear (222) coupled by a shaft (220A) supported by a self-aligning bearing (250) coupled to the housing of the gear transmission (B). The face gear transmission (B) further includes a set of idler pinions (270), each straddle mounted to the housing of the face gear transmission (B) by bearings (280) and (290).

The large gear (221) of each stepped cluster gear (220) is meshed with an input drive gear (210) to receive a driving torque from an input shaft (205), while the small drive gears (222) are sandwiched between, and mesh with, both the idler face gear (230) and the primary face gear (240). Similarly, each of the idler pinions (270) is also sandwiched between, and meshed with, both the idler face gear (230) and the primary face gear (240). The rotational axis ($AR_1$) of the input gear, the rotation axis ($AR_2$) of the stepped gear (220), and the rotation axis ($AR_3$) of the idler and primary face gears (230, 240) each lie in a common plane (S), corresponding to the section plane of FIG. 8.

In the split-torque face gear transmission (B), input power is transmitted from the input shaft (205) to the output shaft (260) through multiple pathways, similar to the split-torque transmissions (A and A1). The input power is split at the small drive gears (222), with a portion delivered directly to the primary face gear (240), and portion delivered to the idler face gear (230). The idler pinions (270) act as a crossover gears, passing the power back from the idler face gear (230) to the primary face gear (240). In doing so, the split power pathways recombine at the primary face gear (240) to drive the output shaft (260).

The amount of input power split between the idler face gear (230) and the primary face gear (24) is determined, among other factors, by the pivoting position ($L_1$) of the self-aligning bearing (250). The same formula (Eqn. 2) used to determine placement of the self-aligning bearings (50, 150) in the split-torque transmissions (A, A1) is applicable to specify the relationship between the load sharing ratio ($LR_T$) and the pivoting position ($L_1$) in the split-torque face gear transmission (B)

Those of ordinary skill in the art will recognize that the present application is not limited to the specific embodiments shown here, and that the general principles disclosed herein may be employed in variations and other applications of the present disclosure without deviating from the spirit of the present disclosure. The embodiments and applications disclosed herein should be considered as ways of explaining and implementing, not as ways of limiting the scope of the present disclosure.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for selectively positioning a support bearing about a shaft of a stepped gear assembly in a transmission system having more than one torque pathway between an input and an output to achieve an optimized load distribution among a set of drive planet pinions and idler planet pinions in the transmission system, comprising:

selecting a pivoting position ($L_1$) of the support bearing along a stepped gear assembly shaft according to:

$$\frac{L_1}{L - L_1} = \left(\frac{1 - LR_T}{1 + LR_T}\right)\frac{D_0}{D_1}$$

where L represents a spacing between a large planet gear and the drive planet pinions of the stepped gear assembly;

$LR_T$ represents a desired load distribution ratio at the meshes between the drive planet pinion and an idler sun gear and between the drive planet pinion and a ring gear of said stepped gear assembly;

$D_0$ is a pitch diameter of the large planet gear in the stepped gear assembly; and $D_1$ is a pitch diameter of the drive planet pinions in the stepped gear assembly.

2. The method of claim 1 for selectively positioning said support bearing about said shaft wherein said desired load distribution ratio $LR_T$ is selected to be within the range of between 0.5 and 1.0.

3. The method of claim 1 for selectively positioning said support bearing about said shaft wherein one of said two meshes of the drive planet pinion with the sun gear or the ring gear carries less load than the other one of said two meshes.

4. The method of claim 1 wherein one of said two torque pathways passes through said drive planet pinions, and wherein the other one of said two torque pathways passes through said idler planet pinions.

5. The method of claim 1 wherein said desired load distribution ratio $LR_T$ is 0.7, and wherein said pivoting position $L_1$ for said bearing is selected according to:

$$L_1 = \frac{L}{1 + 5.667\left(\frac{D_1}{D_0}\right)}.$$

6. The method of claim 1 wherein said transmission system is a epicyclic gear train.

7. The method of claim 1 wherein said transmission system is a split-torque face gear transmission.

8. The method of claim 1 wherein said support bearing is a self-aligning bearing.

9. An improved epicyclic gear train having more than one torque pathway between an input and an output, having a drive sun gear coupled to an input shaft, an idler sun gear, a ring gear, a set of drive planet gear clusters including a large planet gear in engagement with the drive sun gear, and at least one small planet gear axially spaced along a planet shaft and in mesh engagement with said idler sun gear and said ring gear, a set of idler planet gear clusters in mesh engagement with said idler sun gear and said ring gear, a planet carrier coupled to an output shaft, wherein the drive sun gear and the idler sun gear are co-axially arranged and spaced apart along a center axis ($AR_1$), wherein the ring gear is disposed co-axially around the idler sun gear, wherein the drive planet gear clusters are arranged in an annular region between the ring gear and the idler sun gear, and are supported by the planet carrier, wherein the idler planet gear clusters are arranged in the annular space between the ring gear and the idler sun gear, and are supported by the planet carrier, the improvement comprising:

for each planet gear cluster, a pivoting bearing disposed about said associated planet shaft in an axial position $L_1$ selected to achieve a desired load distribution ratio $LR_T$ for torque transfer through said drive planet gear clusters and said idler planet gear clusters, said axial position $L_1$ being selected according to:

$$\frac{L_1}{L - L_1} = \left(\frac{1 - LR_T}{1 + LR_T}\right)\frac{D_0}{D_1}$$

where L represents an axial spacing between the large planet gear and the small planet gear of each drive planet gear cluster;

$LR_T$ represents a desired load distribution ratio at the meshes between the drive planet pinion and the idler sun gear and between the drive planet pinion and the ring gear;

$D_0$ is a pitch diameter of the large planet gears; and $D_1$ is a pitch diameter of the small planet gears.

10. The improved epicyclic gear train of claim 9 wherein said pivoting bearing is a self aligning bearing, selected from a set of self-aligning bearings including an external self aligning bearing and an internal self-aligning bearing.

11. The improved epicyclic gear train of claim 9 wherein said pivoting bearing is a self aligning bearing, selected from a set of self-aligning bearings including a spherical ball bearing, a spherical roller bearing, and a toroidal roller bearing.

12. The improved epicyclic gear train of claim 9 wherein said pivoting bearing is integrated with the planet shaft between the large planet gear and the small planet gear of the planet gear cluster.

13. The improved epicyclic gear train of claim 9 wherein said pivoting bearing is defined by a pair of axially aligned pivot pins, said axially aligned pivot pins disposed to prevent tilting of the planet gear cluster while allowing for unidirectional pivoting of the planet gear cluster in a plane tangential to said center axis.

14. The improved epicyclic gear train of claim 9 wherein said idler sun gear is configured to float in a radial direction with respect to an upper axial retention ring.

15. The improved epicyclic gear train of claim 9, further including a set of rolling surfaces mating at the tangential point of pitch circles of each small drive planet gear and the idler sun gear, a first of said rolling surfaces having a diameter corresponding to a gear pitch diameter for said small drive planet, and a second of said rolling surfaces having a diameter corresponding to the gear pitch diameter for said idler sun gear.

16. The improved epicyclic gear train of claim 15 wherein said set of rolling surfaces are configured to function as rolling elements and to reduce sliding friction at said gear mesh.

17. The improved epicyclic gear train of claim 15 further including, for each small drive planet, an axial retention washer at each axial end face of the small drive planet, each of said axial retention washers configured to maintain said small drive planet and said idler sun gear in an axial position.

18. The improved epicyclic gear train of claim 17 wherein said set of rolling surfaces includes a first cylindrical surface on said axial retention washer adjacent an upper axial end face of the small drive planet, and a second cylindrical surface on a retention ring associated with said idler sun gear, said first and second cylindrical surfaces in rolling engagement.

19. An improved split-torque face gear transmission having an input drive gear engaged with a large gear of a stepped cluster gear, the stepped cluster gear having a shaft coupling the large gear to a small drive gear sandwiched between, and meshed with, an idler face gear and a primary face gear coupled to an output shaft, a set of idler pinions sandwiched between, and meshed with, the idler face gear and the primary face gear, the small drive gears defining a first torque pathway between the input drive gear and the output shaft, and the idler pinions defining a second torque pathway between the input drive gear and the output shaft, the improvement comprising:

a pivoting bearing disposed about said shaft of said stepped cluster gear in an axial position ($L_1$) selected to achieve a desired load distribution ratio $LR_T$ for torque transfer through said first and second torque pathways, said axial position ($L_1$) being selected according to:

$$\frac{L_1}{L-L_1} = \left(\frac{1-LR_T}{1+LR_T}\right)\frac{D_0}{D_1}$$

where L represents an axial spacing between the large gear and the small drive gear of said stepped cluster gear;

$LR_T$ represents a desired mesh load distribution ratio across the small drive gear;

$D_0$ is a pitch diameter of the large gear; and $D_1$ is a pitch diameter of the small drive gear.

20. The improved split-torque face gear transmission of claim 19 wherein said pivoting bearing is a self aligning bearing, selected from a set of self-aligning bearings including an external self aligning bearing and an internal self-aligning bearing.

21. The improved split-torque face gear transmission of claim 19 wherein said pivoting bearing is a self aligning bearing, selected from a set of self-aligning bearings including a spherical ball bearing, a spherical roller bearing, and a toroidal roller bearing.

22. The improved split-torque face gear transmission of claim 19 wherein said pivoting bearing is integrated with the shaft between the large gear and the small drive gear of the stepped cluster gear.

23. The improved split-torque face gear transmission of claim 19 wherein said pivoting bearing includes a pair of axially aligned pivot pins said axially aligned pivot pins disposed to prevent tilting of the stepped cluster gear while allowing for unidirectional pivoting of the stepped cluster gear in a plane tangential (perpendicular) to center axis.

* * * * *